(12) United States Patent
Brown et al.

(10) Patent No.: US 6,863,850 B2
(45) Date of Patent: Mar. 8, 2005

(54) METHOD AND APPARATUS FOR INJECTION FOAM MOLDING

(75) Inventors: Bari William Brown, Ann Arbor, MI (US); George Bernard Byma, Clarkston, MI (US)

(73) Assignee: Lear Corporation, Southfield, MI (US)

(*) Notice: Subject to any disclaimer, the term of this patent is extended or adjusted under 35 U.S.C. 154(b) by 318 days.

(21) Appl. No.: 10/271,468

(22) Filed: Oct. 16, 2002

(65) Prior Publication Data

US 2004/0075184 A1 Apr. 22, 2004

(51) Int. Cl.⁷ .................. B29C 44/02; B29C 44/06
(52) U.S. Cl. .................. 264/46.8; 264/46.4; 264/51; 264/154; 264/155; 264/338
(58) Field of Search .................. 264/46.4, 46.8, 264/51, 154, 155, 338

(56) References Cited

U.S. PATENT DOCUMENTS

| | | | |
|---|---|---|---|
| 4,420,447 A | * 12/1983 | Nakashima | 264/46.4 |
| 4,821,399 A | * 4/1989 | Markley et al. | 29/458 |
| 4,873,032 A | 10/1989 | Kohlhase | |
| 4,891,081 A | * 1/1990 | Takahashi et al. | 156/78 |
| 5,049,056 A | 9/1991 | Baxi et al. | |
| 5,085,568 A | 2/1992 | Turgeon et al. | |
| 5,104,596 A | * 4/1992 | Kargarzadeh et al. | 264/46.5 |
| 5,275,544 A | * 1/1994 | Marlowe | 425/4 R |
| 5,785,247 A | 7/1998 | Chen et al. | |
| 5,882,693 A | 3/1999 | Silkowski et al. | |
| 6,042,354 A | 3/2000 | Loren | |
| 6,200,505 B1 | 3/2001 | Zibert | |
| 6,221,306 B1 | 4/2001 | Johnson | |
| 6,250,903 B1 | 6/2001 | Fernandez et al. | |
| 2002/0030306 A1 | 3/2002 | Zaremba et al. | |

FOREIGN PATENT DOCUMENTS

| | | |
|---|---|---|
| JP | 3-34827 | 2/1991 |
| NL | 6918540 | 6/1970 |
| WO | 95/03927 | 2/1995 |

* cited by examiner

Primary Examiner—Allan R. Kuhns
(74) Attorney, Agent, or Firm—Bill C. Panagos

(57) ABSTRACT

A method of manufacturing a foamed plastic article includes disposing a release film on a mold surface of a mold cavity. At least a portion of a bushing is inserted through the release film to form an aperture in the release film. The bushing defines an inlet for foamable material. The mold cavity is then sealed. The foamable material is then injected into the mold cavity through the inlet, wherein the foamable material is conformed to the shape of the mold cavity.

16 Claims, 3 Drawing Sheets

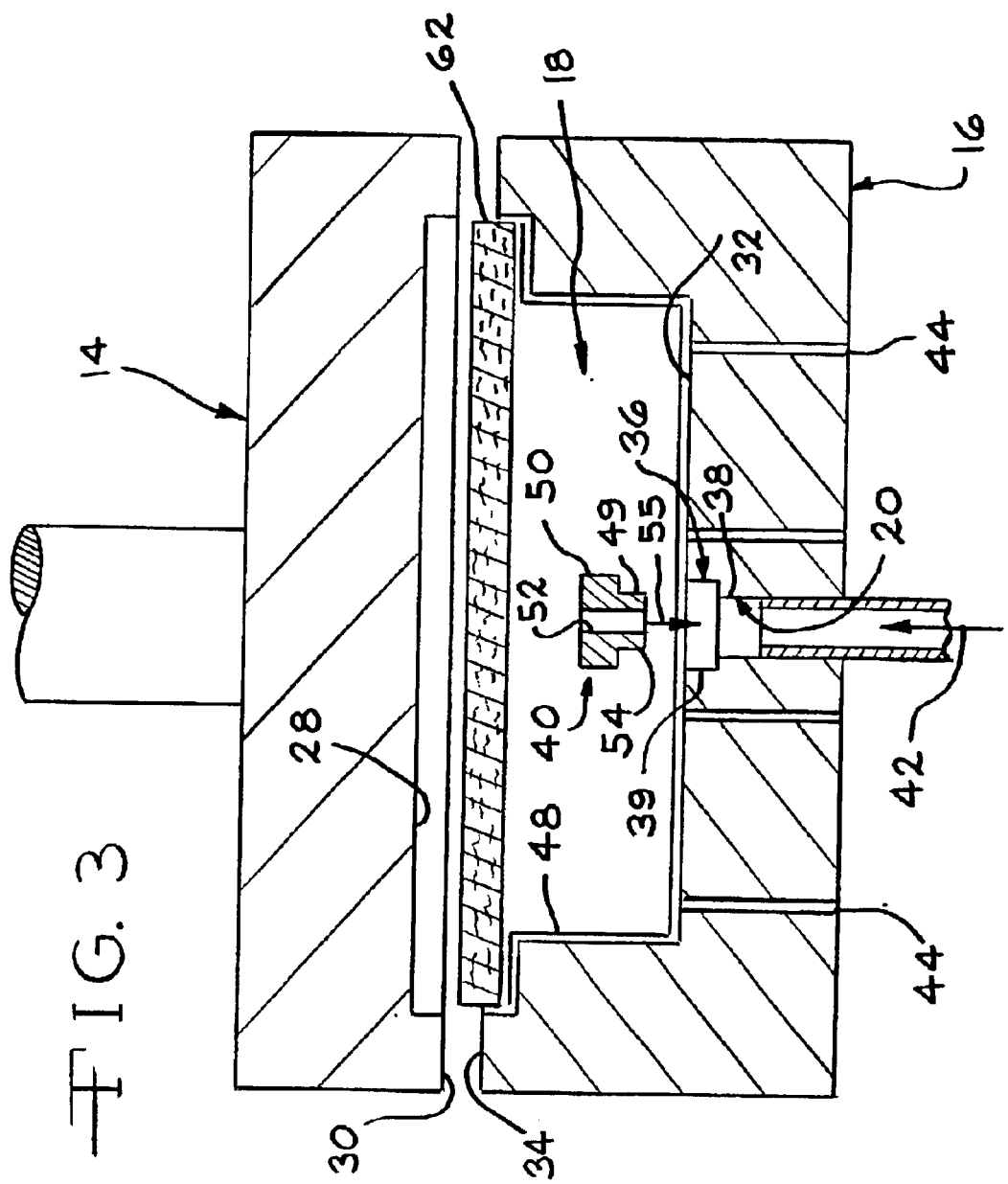
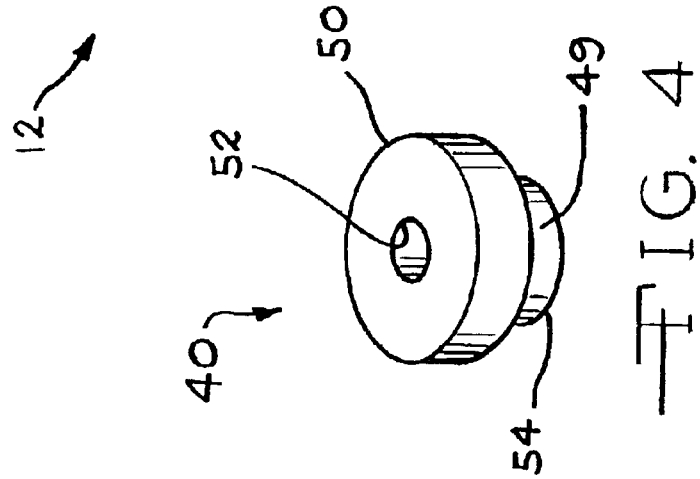

METHOD AND APPARATUS FOR INJECTION FOAM MOLDING

TECHNICAL FIELD

This invention relates to the injection molding of foamed plastic articles and, more particularly, to an improved apparatus and method of injection molding foamed plastic articles.

BACKGROUND OF THE INVENTION

A known method of manufacturing foamed plastic articles is known as a pour-in-place method. In such a method, a film can be placed in the lower mold part of a mold assembly. A vacuum is applied at the molding surface of the lower mold part to draw the film to the molding surface. A foamable material, such as a foamable polyurethane liquid, is poured into the lower mold part on top of the film. A cooperating upper mold part, having a molding surface which defines a desired shape, is moved into cooperating engagement with the lower mold part. If desired, a component such as carpet, is placed on the foamable material. The foamable material is foamed and cured under heat and pressure, resulting in a relatively rigid substrate of foamed material with the component attached thereto. The resulting article has an exterior surface, such as carpet, backed by a foam layer. However, application of the film can add undesirable additional time to the manufacturing method.

Another known method of manufacturing foamed plastic article is known as injection molding. In a typical injection molding process, a plastic material, such as a foamable material, is introduced into the cavity of a closed hollow mold. Film is typically not used in such an injection molding process, and frequent cleaning of the mold surfaces can be required. The foamed plastic articles formed therein can also adhere to the mold surface, and the removal of such articles from the mold can add undesirable time to the manufacturing process. It would therefore be desirable to provide an improved method of manufacturing foamed plastic articles.

SUMMARY OF THE INVENTION

This invention relates to an improved apparatus and method of injection molding foamed plastic articles. Initially, a release film is disposed on a mold surface of a mold cavity. Preferably, a vacuum is applied at the mold surface to draw the release film into conformity with the mold surface. At least a portion of a bushing is then inserted through the release film to form an aperture in the release film. The bushing defines an inlet for foamable material. Preferably, the bushing is snap-fit within a bore in the mold surface, and a portion of the bushing retains the release film to the mold surface of the mold cavity. The mold cavity is then sealed. The foamable material is then injected into the mold cavity through the inlet, and the foamable material is conformed to the shape of the mold cavity, thereby defining the foamed plastic article. The bushing is preferably generally cylindrical. A generally disk-shaped flange defines one end of the bushing, and a substantially longitudinal conduit is formed through the bushing.

In an alternate embodiment of the invention, the bushing is threaded and received in corresponding threads of the bore in the mold surface.

In another alternate embodiment of the invention, the film is adhered to the article.

In another alternate embodiment of the invention, the bushing is formed to the article, such that the bushing remains with the article when the article is removed from the mold.

In another alternate embodiment of the invention, the release film is adhered to the mold surface.

In another alternate embodiment of the invention, an object is disposed within the mold cavity, and the foamable material is adhered to the object.

Various objects and advantages of this invention will become apparent to those skilled in the art from the following detailed description of the preferred embodiment, when read in light of the accompanying drawings.

BRIEF DESCRIPTION OF THE DRAWINGS

FIG. 3 is an enlarged cross-sectional end view of the stationary mold portion illustrated in FIGS. 1 and 2, taken along line 3—3 of FIG. 1.

FIG. 4 is a perspective view of the bushing used in accordance with the method of this invention.

DETAILED DESCRIPTION OF THE INVENTION

Figure 1:
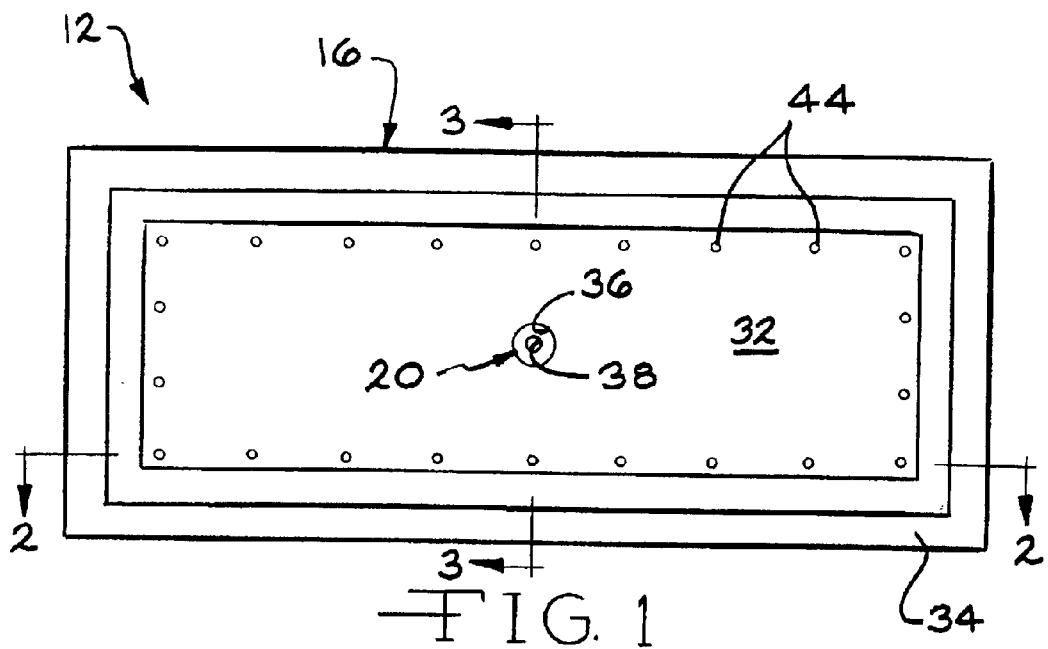
FIG. 1 is a schematic plan view of a stationary mold portion of a mold assembly used in accordance with the method of this invention, showing the movable mold portion removed.
Figure 2:
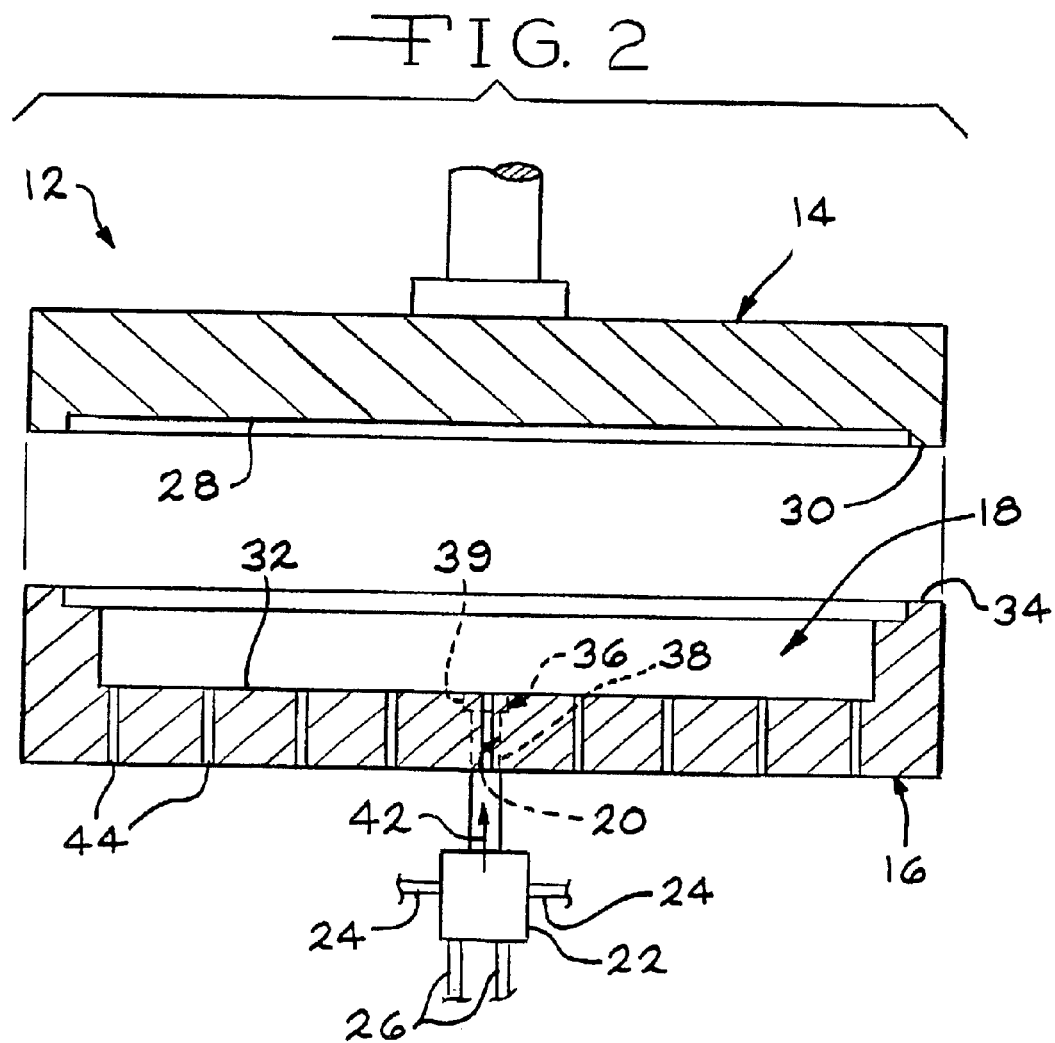
FIG. 2 is a schematic cross sectional elevational view of the stationary mold portion illustrated in FIG. 1, taken along line 2—2 of FIG. 1, and showing the movable mold portion of the mold assembly.
Figure 6:
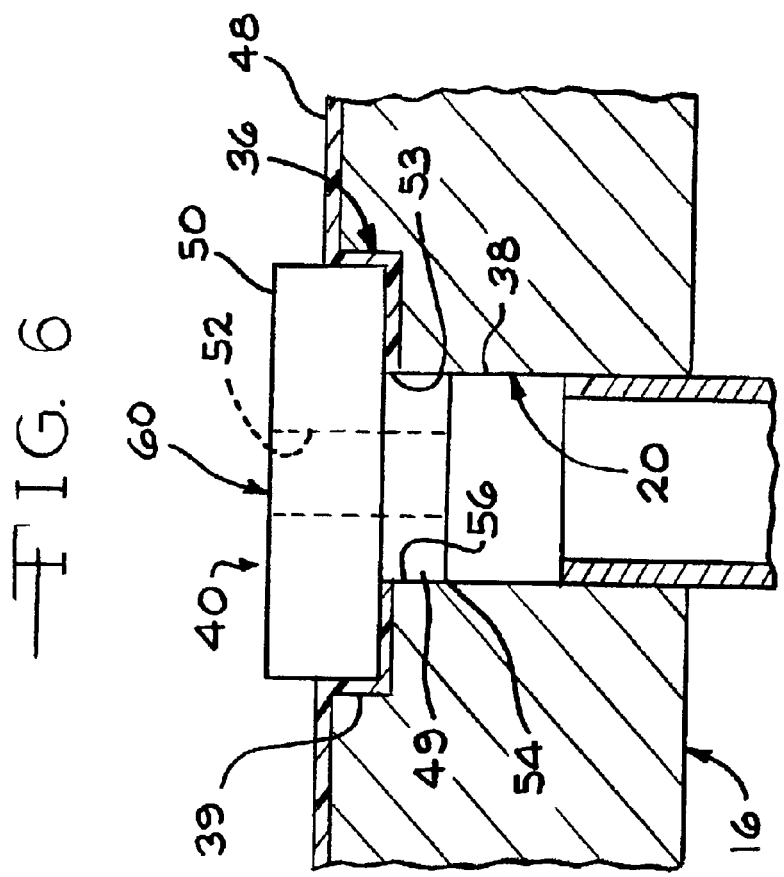
FIG. 6 is an enlarged cross-sectional view of the inlet bore illustrated in FIG. 3, showing the bushing disposed therein.

Referring now to FIGS. 1 through 5, inclusive, a foamed plastic article 10 is formed by a mold assembly 12. The mold assembly 12 includes movable and stationary mold portions, 14 and 16, respectively, which are relatively movable between an open position, as shown in FIGS. 2 and 3, and a closed position (not shown). In the open position, the movable and stationary mold portions, 14 and 16, are spaced from one another such that the finished foamed plastic article 10 can be removed. When the mold assembly 12 is in the closed position, the movable and stationary mold portions 14 and 16 cooperate to define a mold cavity 18 for forming the article 10. The mold assembly 12 can be formed from any desired material, such as hardened steel, cast aluminum, or plastic composite materials.

The movable and stationary mold portions 14 and 16 are preferably mounted to platens (not shown) of a press (not shown), such as a vertical molding press with sufficient tonnage to accomplish the method herein described. Preferably, the stationary mold portion 16 includes an inlet bore 20 for fluid communication between a mixhead device 22 and the mold cavity 18. The mixhead device 22 is preferably a mixhead for a conventional reaction injection molding process, and would be understood by those skilled in the art. Reaction injection molding is a process for molding material, such as polyurethane, epoxy, and other desired liquid chemical systems.

Preferably, the mixhead device 22 includes supply lines 24 for supplying two liquid reactants, such as an isocyanate and a polyol, from a source of liquid reactants (not shown). Return lines 26 can also be provided for returning unmixed reactants from the mixhead device 22 to the respective sources of liquid reactants. When injection of the liquids into the mold assembly 12 begins, valves (not shown) in the mixhead device 22 open. The liquid reactants enter a chamber in the mixhead device 22 at a pressure between from about 1,500 to about 3,000 pounds per square inch, and are preferably mixed by high-velocity impingement to form a mixed liquid.

From the mixhead device 22, the mixed liquid flows into the mold cavity 18 of the mold assembly 12 at low pressure, such as about atmospheric pressure. Inside the mold cavity 18, the mixed liquid undergoes an exothermic chemical reaction in which the mixed liquid foams or expands and preferably forms a polyurethane polymer in the mold cavity 18.

If desired, a clamping mechanism (not shown) can be preferably connected to the mold portions 14 and 16 for holding the mold portions 14 and 16 together when the mold assembly 12 is in the closed position.

The movable mold portion 14 includes a first mold surface 28 which defines a portion of the interior of the mold cavity 18. A second mold surface 30 is exterior to the mold cavity 18. The stationary mold portion 16 includes a third mold surface 32 which defines a portion of the interior of the mold cavity 18, and forms the finished appearance of a foam portion 33 of the article 10. A fourth mold surface 34 is exterior to the mold cavity 18 and forms a support surface for the corresponding second mold surface 30 of the movable mold portion 14.

The inlet bore 20 is preferably cylindrical and includes an enlarged diameter portion 36 adjacent the third mold surface 32, and a reduced diameter portion 38. More preferably, an upper portion of the inlet bore 20 defines a countersunk portion 39 having a shape corresponding to the shape of a bushing 40, as will be described herein. The inlet bore 20 is positioned to allow the flow of injected liquid or foamable material from the mixhead device 22 through the third mold surface 32 and into the mold cavity 18. The direction of flow of foamable material is shown by an arrow 42 in FIGS. 2 and 3.

Preferably, a plurality of vacuum channels 44 are formed in the third mold surface 32 of the stationary mold portion 16 and are connected to a source of vacuum (not shown). The vacuum channels 44 illustrated are formed about a perimeter 46 of the mold cavity 18, although such is not required. The vacuum channels 44 can also be formed in any desired location and any desired arrangement in the third mold surface 32.

As best shown in FIGS. 2 and 3, a first step of the method of the invention includes providing the mold assembly 12. Release film 48 is then disposed adjacent the third mold surface 32 of the mold cavity 18. It will be understood however, that the release film 48 can be disposed adjacent any surface which defines the interior of the mold cavity 18. Preferably, a vacuum is applied through the vacuum channels 44 in the third mold surface 32 to draw the release film 48 into conformity with the third mold surface 32, although a vacuum is not required. The release film 48 can be held in a desired position relative to the third mold surface 32 by any desired method, such as clips or fasteners (not shown), an adhesive, or by gravity. The release film 48 can be formed of any desired material, such as polyethylene, polypropylene, or thermoplastic polyurethane (TPU).

A bushing 40 is then provided. The bushing 40 preferably includes a generally cylindrical body 49. A disk-shaped flange 50 is preferably formed at one end of the body 49. A substantially longitudinal conduit 52 is formed through the body 49 and the flange 50. The bushing 40 can be formed of any desired material, such as nylon, polypropylene, polyethylene, cast urethane, rubber, or hardened cardboard. Preferably, the bushing 40 is formed from an inexpensive, lightweight, and disposable material, such as hardened cardboard.

The bushing 40 is then moved in the direction of an arrow 55 and inserted through a portion of the release film 48 to form an aperture 53 in the release film 48. The bushing 40 is then inserted into the countersunk portion 39 of the inlet bore 20 of the third mold surface 32. Preferably, the aperture 53 in the release film 48 is formed when an edge portion 54 of the bushing 40 contacts a shoulder portion 56 of the inlet bore 20, a portion of film material thereby being cut from the release film 48.

The bushing 40 is preferably releasably retained within the inlet bore 20 in a snap-fit arrangement, although a snap-fit is not required. The bushing 40 can be 5 retained within the inlet bore 20 by any desired method. For example, the bushing 40 can include a threaded portion (not shown) for insertion into a corresponding threaded portion of the inlet bore 20. Preferably, the flange 50 of the bushing 40 retains the film 48 between the flange 50 and the countersunk portion 39 of the inlet bore, thereby sealing the film 48 about the inlet bore 20. Once inserted into the inlet bore 20, the bushing 40 defines an inlet 60 for fluid communication between the mixhead device 22 and the mold cavity 18. Although the illustrated bushing 40 is generally cylindrical in shape, it will be understood that the bushing 40 can have any desired shape such that the bushing 40 can be positioned within the mold cavity 18 to allow fluid communication between the mixhead device 22 and the mold cavity 18.

An object, such as a headliner 62, as shown in FIG. 3, is then disposed within the mold cavity 18. The mold cavity 18 is then sealed, preferably by lowering the movable mold portion 14 and thereby moving the mold assembly 12 to the closed position. The foamable material is then injected into the mold cavity 18 through the inlet 60 defined by the bushing 40. The foamable material then expands to conform to the shape of the mold cavity 18, is cured as described herein, and forms the foam portion 33. Preferably, the foam portion 33 adheres to the headliner 62, thereby defining the foamed plastic article 10, as best shown in FIG. 4.

After the foamed plastic article 10 is formed, the film 48 preferably remains attached to the foam portion 33. The film 48 advantageously and substantially reduces the formation of flash (e.g. excess foam material, commonly formed at a parting line of a mold), substantially eliminates residue which is known to be left behind in conventional injection molds, and provides easy release and removal of the foamed plastic article 10 from the mold cavity 18. Additionally, the film 48 can provide a fluid or vapor barrier, which inhibits fluid absorption by the foam portion 33, and inhibits fluid flow from the atmosphere, through the foam portion 33, to the headliner 62. The film 48 can also provide other desired benefits, such as noise absorption.

The film 48 can also be of a type which does not remain attached to the foam portion 33, but which adheres to the mold surface 32. Such a film 48 is capable of being used as a release film through several molding operations, only being replaced once the release effect has been diminished.

Figure 5:
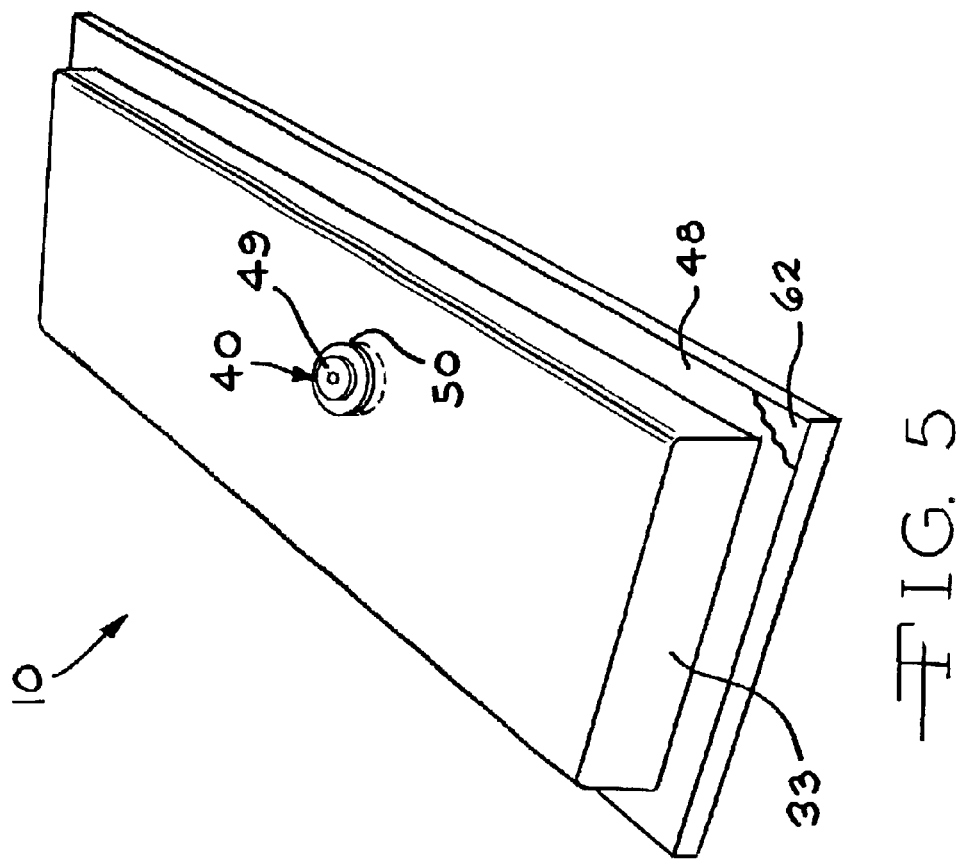
FIG. 5 is schematic elevational view of a foamed plastic article manufactured according to the method of this invention, showing the release film covering the foam portion of the foamed plastic article.

Preferably, the bushing 40 is formed from an inexpensive, lightweight, and disposable material, such as hardened cardboard. As shown in FIGS. 4 and 5, the flange 50 of such a bushing 40 preferably adheres to the cured foam portion 33, and remains with the foamed plastic article 10, when the article 10 is removed from the mold cavity 18. Since such a bushing 40 need not be separately removed from the inlet bore 20 between molding operations, molding cycle time is reduced.

However, if desired, the bushing 40 can be attached within the inlet bore 20 by a method, such as threaded attachment, such that the bushing 40 remains in the within the inlet bore 20 after the finished foamed plastic article 10 is removed from the mold cavity 18. Such a threaded bushing 40 can then be removed from the inlet bore 20 after the foamed plastic article 10 has been removed from the mold cavity 18.

Although illustrated schematically in FIGS. 1 through 3, it will be appreciated that the first and third mold surfaces 28 and 32 may be of any desired shape and contour. For example, first mold surface 28 can be a mold core, and second mold surface 30 can be a corresponding mold cavity. Additionally, although the mold assembly 12 illustrated has a generally horizontal orientation, the mold assembly of the invention can be oriented in any desired manner, such as in a generally vertical orientation.

It will be understood that the invention can be used to form foamed plastic articles 10 having different configurations, such as foam-backed carpet assemblies, or foam-backed headliner assemblies. It will also be understood that, in the practice of the invention, the foamable material can be introduced from either or both of the first and third mold surfaces 28 and 32.

The principle and mode of operation of this invention have been described in its preferred embodiments. However, it should be noted that this invention may be practiced otherwise than as specifically illustrated and described without departing from its scope.

What is claimed is:

1. A method of manufacturing a foamed plastic article, the method comprising the steps of:
   a. disposing release film on a mold surface of a mold cavity;
   b. inserting at least a portion of a bushing through the release film to form an aperture in the release film, the bushing defining an inlet for foamable material;
   c. sealing the mold cavity; and
   d. injecting the foamable material into the mold cavity through the inlet, the foamable material being conformed to the shape of the mold cavity, thereby defining a foamed plastic article.

2. The method according to claim 1, further including a step (e) subsequent to step (a), wherein an object is disposed within the mold cavity.

3. The method according to claim 2, wherein step (d) includes the foamable material adhering to the object.

4. The method according to claim 1, further including a step (f) subsequent to step (c), wherein a vacuum is applied at the mold surface to draw the release film into conformity with the mold surface.

5. The method according to claim 1, further including a step (g) subsequent to step (d), wherein the foamed plastic article is removed from the mold cavity.

6. The method according to claim 5, further including a step (h) subsequent to step (b), wherein the bushing is disposed within a bore in the mold surface.

7. The method according to claim 6, wherein step (g) further includes the bushing remaining within the mold surface after the foamed plastic article is removed from the mold cavity.

8. The method according to claim 6, wherein an upper portion of the bore defines a countersunk portion, the bushing being disposed within the countersunk portion of the bore.

9. The method according to claim 6, wherein the bushing is snap-fit within the bore in the mold surface.

10. The method according to claim 6, wherein the bushing is threaded and received in corresponding threads of the bore in the mold surface.

11. The method according to claim 1, wherein step (d) includes allowing the foamable material to remain in the mold cavity until the foamable material becomes cured foam.

12. The method according to claim 1, wherein step (d) includes the release film being adhered to the foamed plastic article.

13. The method according to claim 1, wherein step (d) includes the bushing being formed to the foamed plastic article, such that the bushing remains with the foamed plastic article when the foamed plastic article is removed from the mold cavity.

14. The method according to claim 1, wherein step (a) includes the release film being adhered to the mold surface.

15. The method according to claim 1, wherein the bushing is generally cylindrical, a generally disk-shaped flange defining one end thereof, and a substantially longitudinal conduit formed therethrough.

16. The method according to claim 6, further including a step (i) subsequent to step (b), wherein a portion of the bushing retains the release film to the mold surface of the mold cavity about the bore.

* * * * *